Patented Nov. 13, 1923.

1,474,035

UNITED STATES PATENT OFFICE.

ALFRED HOFFMAN, OF KEW GARDENS, NEW YORK, ASSIGNOR TO ALCO DEO COMPANY, OF WALLINGTON, NEW JERSEY, A CORPORATION OF NEW JERSEY.

PROCESS OF MAKING MESITYL OXIDE, ETC.

No Drawing.   Application filed March 23, 1922.   Serial No. 546,163.

*To all whom it may concern:*

Be it known that I, ALFRED HOFFMAN, a citizen of the United States of America, residing at Kew Gardens, Long Island, New York, have invented a new and useful Process of Making Mesityl Oxide, Etc., of which the following is a specification.

The main object of my invention is to provide a practical method of producing mesityl oxide from commercial diacetone alcohol which frequently contains or is accompanied by considerable quantities of acetone. There are several ways of carrying out my invention which involves the use of minute quantities of an aqueous solution of hydrochloric acid and distillation. The formula of diacetone alcohol is usually given as:

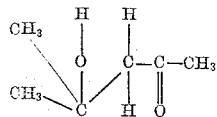

Mesityl oxide is considered to be:

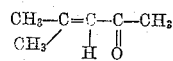

The removal of the hydrogen and oxygen is accomplished for instance by adding chlorine or bromine gas bubbled through it and then heating gradually to the boiling point and until the distillate is somewhat cloudy. The distillation is then diverted into another receiver and the mesityl oxide collected. Distillation should be stopped just before white fumes come off. The oxide may be dried and freed of acetone if necessary.

The oxide may also be formed as follows: Mix 1 gram of bleaching powder containing about .3 g. of Cl. with 1.5 cc. of a 20% solution of sulphuric acid and 500 cc. of diacetone alcohol, shake and filter. Then add 1500 more cc. of diacetone alcohol and gradually heat to boiling point and distill as before mentioned.

The amount of chlorine necessary is so small that it appears that the action is probably catalytic.

Another method of making mesityl oxide is to add hydrochloric acid containing hydrogen chloride to the equivalent of approximately one tenth of one per cent of the diacetone alcohol by weight and then distil. After the first distillate is discarded water may be added to facilitate the distillation of the mesityl oxide. Even when the chlorine is added in the form of gas or in bleaching powder it immediately forms hydrochloric acid and in my opinion it is the acid which causes the reaction necessary to convert the diacetone alcohol to mesityl oxide.

The process may be carried out at ordinary atmospheric pressures.

I claim:

1. The process of forming mesityl oxide which comprises adding a minute quantity of an aqueous solution of hydrochloric acid to diacetone alcohol, gradually heating to the boiling point, and continuing the distillation and collection of the mesityl oxide.

2. The process of forming mesityl oxide which comprises adding an aqueous solution of hydrochloric acid to a liquid containing diacetone alcohol, distilling the liquid and collecting the mesityl oxide by condensation.

ALFRED HOFFMAN.